United States Patent Office 2,952,620
Patented Sept. 13, 1960

2,952,620

SEPARATION OF HYDROCARBON OIL-SOLID PARTICLE SUSPENSIONS

Dennis E. Wade, Texas City, Tex., assignor to The American Oil Company, Texas City, Tex., a corporation of Texas No Drawing. Filed Dec. 1, 1958, Ser. No. 777,233

3 Claims. (Cl. 208—162)

This invention relates to suspensions of solid particles in hydrocarbon oils. More particularly, the invention relates to the separation of such suspensions by procedure not involving elaborate decantation or filtration equipment.

In many operations in petroleum refining, a suspension of solid particles in a hydrocarbon oil is obtained as a by-product. For example, in fluidized catalytic cracking, the carry over of solid catalyst particles is recovered in the form of a suspension in a heavy gas oil. This suspension cannot be sold or even utilized within the refinery because of the "ash content" and the abrasive action of the solids on burner tips. The decanted oil is not a good feed to the fluidized catalytic cracking process but, nevertheless, is normally recycled to this operation as a method of disposal. Essentially the same type of problem exists in several other refining operations utilizing solid catalyst particles. In other operations, suspensions are produced as a by-product of operations such as polymerization owing to disintegration of catalyst particles; a salable product can not be produced frequently without removal of the catalyst fines. These solid particles can be removed by filtration or centrifugal separation; in some situations, decantation equipment may be used to remove substantially all of the suspended solids. All of the operations now known require elaborate equipment and large capital investments.

An object of the invention is a method of separating a suspension of solid particles in a hydrocarbon oil. A particular object is a simple, cheap method which does not require elaborate mechanical decantation or filtration equipment. A further object is a method of separating suspensions utilizing conventional liquid-liquid contacting equipment and simple gravimetric decantation procedures such as are commonly utilized in petroleum refineries. Other objects will become apparent in the course of the detailed description.

In the method of the invention, the suspension of solid particles in a hydrocarbon oil are intermingled with an aqueous solution containing a nonionic surface active agent. Contrary to expectations, the solid particles are not transferred from the oil to the aqueous solution. Instead, a three-layer system is formed upon the settling of the intermingled suspension and solution with the solid particles, along with some oil and some water, forming an intermediate layer between the upper hydrocarbon layer and the lower aqueous layer. The three layers may be readily separated by ordinary decantation procedures.

The suspension to which the method of the invention is applicable consists essentially of solid particles and a hydrocarbon oil. The hydrocarbon oil may be a petroleum hydrocarbon mixture such as a naphtha or a gas oil. Or, the hydrocarbon oil may be a single compound utilized as a reaction medium such as benzene, toluene, or a xylene or heptane or octane. The method of the invention is applicable to hydrocarbons which are normally solid at ordinary atmospheric temperatures such as waxes. In those cases wherein the suspension is either very viscous or solid at ordinary atmospheric temperature, the method is carried out at a temperature such that the suspension becomes sufficiently liquid to permit the degree of intermingling required to withdraw the solid particles from the oil.

The solid particles which are dispersed in the defined hydrocarbon oil may be any solid of a size suspendable in the particular oil. It is readily apparent that an oil of low viscosity such as a naphtha will not be able to suspend particles of the same size which are suspendable in a viscous oil such as a lubricating base stock. It is to be understood that the term "suspension" as utilized herein includes not only those mixtures which are essentially non-settling regardless of time, but also those mixtures which would settle the solid particles if the necessary number of hours or days could economically be permitted to elapse. In general, the suspensions produced in petroleum refining or treating operations will contain solid particles of silica-alumina, silica-magnesia, activated clays, molybdenum oxide on alumina, cobalt and molybdenum oxide on alumina, chromia on alumina or silica alumina, and platinum on alumina.

The method of the invention is particularly applicable to suspensions produced in catalytic operations wherein the solid catalyst particles or by-product fines range in size from about 0 to about 300 microns. More usually the suspension of solid particles will range from about 0 through 100 microns. The amount of solid particles present may range from that which produces an objectionable degree of ash, or impairment of product quality, through to the maximum suspendable by the particular oil.

The solid particles are withdrawn (separated) from the hydrocarbon oil through the action of an aqueous solution. Preferably the aqueous solution consists of ordinary water containing a nonionic surface active agent (detergent). However, the aqueous solution may contain materials commonly present in water such as salt from brackish waters.

It has been found that the nonionic detergents permit the separation of the solids from the hydrocarbon oil without formation of foam or emulsions which would interfere with separation, (or even introducing a worse problem of a by-product oil-solid-water emulsion). It appears that any nonionic surface active agent which has substantial solubility in water may be utilized. It is to be understood that "substantial solubility" means the agent is soluble in water to a degree sufficient to permit the separation of the suspension by the method of this invention. The preferred class of nonionic agents are the condensation reaction products of ethylene oxide with alkylphenols having a total of from 6 to 12 carbon atoms present as alkyl substituents, fatty acids, aliphatic alcohols, esters, aldehydes, and amines. Any of these reactants which are utilized in commercial nonionic detergents of this type may be utilized in preparing a detergent suitable for use in the method of this invention. Illustrations of suitable agents of this preferred class are ethylene oxide and stearic acid; ethylene oxide and oleic acid; ethylene oxide, ethylamine, and stearic acid; ethylene oxide and castor oil; ethylene oxide and coconut oil fatty acids; ethylene oxide and cetyl alcohol; ethylene oxide and olelyl alcohol; ethylene oxide and abietinol; ethylene oxide and tall oil; ethylene oxide and monostearate of propylene glycol; ethylene oxide and the stearyl ester of ethanolamine; ethylene oxide and sorbitan mono-laurate; ethylene oxide and sorbitan monostearate; particularly suitable agents are the condensation reaction products of tall oil and about 15 moles of ethylene oxide per mole of said tall oil, and also, the condensation reaction product of diisobutylphenol and 9–10 moles of ethylene oxide per mole of said phenol.

The amount of defined agent present in the aqueous solution must necessarily be sufficient to permit the separation to take place. More than this amount, up to the solubility of the agent in the aqueous solution at intermingling conditions, may be used. As all of these agents have some solubility in hydrocarbon oil, it is preferred to operate with the minimum amount of agent in order to reduce losses into the hydrocarbon oil.

The suspension and the aqueous solution are intermingled at a temperature permitting effective contacting with a minimum of power, or expensive but efficient equipment. In most cases, operation with water, not more than luke warm, will do the trick. The degree of intermingling and the length of time of this mixing will be determined by the particular suspension, the particular agent, and also, the effectiveness of the mixing device. It is self-evident that the amount of aqueous solution used will be determined by the suspension and other operating conditions.

After the suspension and aqueous solution have been intermingled (mixed) for a sufficient time, the mixing device may be turned off in a batch operation or in a continuous operation, the intermingled suspension-solution is passed to a separate settling zone. In the settling zone, the intermingled suspension-solution is allowed to remain for a time long enough to obtain a three layer system. The settling zone contains an upper layer of hydrocarbon oil substantially free of solid particles, a lower aqueous solution layer containing some solid particles; substantially all of the solid particles originally present in the suspension appear in an intermediate layer along with some oil and some aqueous solution. The particle containing layer is sufficiently mobile to permit withdrawal from the settling zone and transfer to tankage or tank transportation to disposal.

*Example*

A heavy gas oil containing suspended silica-alumina catalyst derived from a fluidized catalytic cracking process was the suspension in the following example. The catalyst particles ranged in size from about 0 to 100 microns. This "decanted oil" would release a majority of the suspended solids only after some days of settling at ordinary atmospheric temperature (70°–90° F.). The aqueous solution consisted of ordinary drinking water containing two drops of a commercial nonionic surface active agent; this agent consisted of the condensation reaction product of diisobutylphenol and 9–10 moles of ethylene oxide per mole of the phenol. Equal volumes of suspension and solution were shaken in a flask by hand for 2–3 minutes. The flask containing the mixture was allowed to settle for 5 minutes. Three layers appeared in the flask. The three layers were separated by withdrawing successively the lower aqueous layer, the intermediate solid-containing layer, and the upper hydrocarbon oil layer, which was substantially free of solid particles as determined by its transparency.

In another test, a commercial anionic detergent (an alkyl fatty acid sulfonate) was used as the agent under the conditions of the above example. A very stable emulsion of oil, solid particles, and water was formed. It was topped by a thick layer of stable foam. Prolonged settling did not cause the emulsion to release the oil or solid particles.

*Illustrative embodiment*

The method of the invention is applied to a problem common to virtually every petroleum refinery in North America. Virtually every refinery carries out an "operation" wherein virgin gas oils (frequently in admixture with cracked gas oils) are contacted with a solid catalyst in a so-called fluidized bed reactor at temperatures on the order of 900° F. to convert the gas oil into a wide range of catalytically cracked products. The catalytically cracked products range from gases through naphtha through light gas oils to heavy gas oils boiling in excess of 1000° F. The solid catalyst utilized in the fluidized catalytic cracking process ranges in size, fresh, from about 10 to 300 microns with 80% or more being 100 microns or smaller in size. Attrition results in a build up of material down to less than 1 micron in size.

The vapors produced in the reactor carry along catalyst particles. The vapor and entrained solids are condensed either totally or partially under conditions such that the solid catalyst particles are removed from the remaining gases and vapors. Usually, a high boiling gas oil is the product of the first condensation and contains the entrained solid particles. This heavy gas oil and catalyst is passed into a mechanical settler wherein those particles fairly readily separable are removed. The overflow from the mechanical separator contains suspended solid catalyst particles and this overflow product is known as decanted oil. The decanted oil has a boiling range such that it is suitable for fuel oil use—if no catalyst particles were present. The nature of the hydrocarbons present in the decanted oil make it a very poor charge to the catalytic cracking operation.

The decanted oil, at a temperature of about 100° F., is passed into a pipe mixer along with an equal volume of water containing about 0.2 weight percent of a nonionic detergent; the water detergent solution is also at about 100° F. From the pipe mixer, the stream of intermingled decanted oil and solution is passed into a vertical separator drum. In this drum, three layers are present, namely, an upper oil layer substantially free of solid catalyst particles; a lower water layer also substantially free of solid catalyst particles; and an intermediate layer containing essentially all of the catalyst particles present in the decanted oil along with some oil and water. The oil and water content is such that the intermediate layer may be withdrawn as a viscous liquid from the settler.

The three layers are withdrawn separately and continuously from the settler. The oil product is passed to storage for use as blending stock in the production of heavy fuel oil. The aqueous solution layer is withdrawn and recycled to the mixing step; periodically, nonionic detergent is added to maintain the solution at a condition suitable for the separation.

The intermediate layer of catalyst oil and water may be dumped in a suitable waste disposal area, which is preferably provided with open facilities for burning the oil content.

When the activity level of the circulating catalyst in the fluidized catalytic cracking operation does not require discard of the particles separated from the decanted oil, the catalyst containing intermediate layer is returned to the operation. The catalyst containing material is passed directly into the regenerator where the oil is burned, the water vaporized, and the carbon burned off the catalyst particles to regenerate these particles, it then passes along with the main body of regenerated catalyst back to the reactor.

Thus having described the invention, what is claimed is:

1. A method of separating a suspension of solid silica-alumina catalyst particles in a hydrocarbon oil, which method comprises intermingling said suspension with an aqueous solution containing a nonionic surface active agent, allowing said intermingled suspension-solution to settle, thereby obtaining a three layer system consisting of an upper hydrocarbon oil layer substantially free of solid particles, a lower aqueous solution layer and an intermediate layer containing substantially all of the solid particles previously present in said suspension, and separating said three layers.

2. The method of claim 1 wherein said suspension is derived from a fluidized catalytic cracking process.

3. The method of claim 1 wherein said agent is the condensation reaction product of diisobutylphenol and 9–10 moles of ethylene oxide per mole of said phenol.

References Cited in the file of this patent

UNITED STATES PATENTS

| | | |
|---|---|---|
| 2,384,967 | Schumacher et al. | Sept. 18, 1945 |
| 2,518,337 | Krebs | Aug. 8, 1950 |
| 2,780,585 | Musslewhite | Feb. 5, 1957 |